US006728780B1

(12) United States Patent
Hebert

(10) Patent No.: US 6,728,780 B1
(45) Date of Patent: *Apr. 27, 2004

(54) HIGH AVAILABILITY NETWORKING WITH WARM STANDBY INTERFACE FAILOVER

(75) Inventor: James E. Hebert, Fairport, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 666 days.

This patent is subject to a terminal disclaimer.

(21) Appl. No.: 09/588,139

(22) Filed: Jun. 2, 2000

(51) Int. Cl.[7] ............................................. G06F 15/173
(52) U.S. Cl. ....................... 709/239; 709/225; 709/231; 714/4; 714/40
(58) Field of Search ................................ 709/105, 225, 709/226, 229, 201, 238, 240, 231, 245, 239

(56) References Cited

U.S. PATENT DOCUMENTS

| | | | |
|---|---|---|---|
| 4,607,256 A | 8/1986 | Henzel | |
| 5,774,660 A | 6/1998 | Brendel et al. | |
| 5,832,197 A | 11/1998 | Houji | |
| 5,917,997 A | 6/1999 | Bell et al. | |
| 5,935,215 A | * 8/1999 | Bell et al. ................... | 709/239 |
| 5,948,108 A | 9/1999 | Lu et al. | |
| 5,951,650 A | 9/1999 | Bell et al. | |
| 6,052,733 A | 4/2000 | Mahalingam et al. | |
| 6,065,073 A | 5/2000 | Booth | |
| 6,173,411 B1 | 1/2001 | Hirst et al. | |
| 6,243,825 B1 | 6/2001 | Gamache et al. | |
| 6,275,470 B1 | 8/2001 | Ricciulli | |
| 6,308,282 B1 | 10/2001 | Huang et al. | |
| 6,314,525 B1 | 11/2001 | Mahalingham et al. | |
| 6,324,161 B1 | 11/2001 | Kirch | |
| 6,366,558 B1 | 4/2002 | Howes et al. | |
| 6,389,448 B1 | 5/2002 | Primak et al. | |
| 6,393,485 B1 | 5/2002 | Chao et al. | |
| 6,430,622 B1 | 8/2002 | Aiken et al. | |
| 6,438,705 B1 | 8/2002 | Chao et al. | |

OTHER PUBLICATIONS

"Fast Cluster Failover Using Virtual Memory–Mapped Communication," Zhou, et al, Proceedings of the 13th ACM International Conference on Supercomputing, 1999.
Mingus, Larry; "How–to: Simple 2 Computer Network wo/hub"; Jul. 10, 1998; http://www.makeitsimple.com/how–to/simple.htm.
"Sun Trunking 1.2," Sun Microsystems, Inc., 1999.
"Availability Features in the Sun™ X500 Server Family," Sun Microsystems, Inc.

* cited by examiner

*Primary Examiner*—David Wiley
*Assistant Examiner*—Phuoc Nguyen
(74) *Attorney, Agent, or Firm*—Meyertons Hood Kivlin Kowert & Goetzel, P.C.; Rory D. Rankin

(57) ABSTRACT

A method and mechanism operating within the Application layer of the architectural model for maintaining high availability in a two node computer network. A backup connection is created wherein a second network card is added to each node of a two node network and a crossover cable is coupled between them. Each backup network card is configured with dummy parameters and taken down upon startup. A failover mechanism operating within the Application layer monitors the original, primary network connection. Upon detecting a failure of the primary connection, the failover mechanism halts monitoring of the primary connection, configures the backup network interface with the parameters of the primary network interface, and brings up the backup interface.

39 Claims, 13 Drawing Sheets

HIGH AVAILABILITY NETWORKING WITH WARM STANDBY INTERFACE FAILOVER

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention is related to the field of computer networks and, more particularly, to maintaining the high availability of a computer network with a warm standby.

2. Description of the Related Art

With the ever expanding use of computer networks throughout society has come an increasing dependence of users on the availability of that network. If a network goes down, or is otherwise unavailable, costs to an enterprise may be significant. Consequently, a number of techniques have arisen which are designed to ensure that a computer network is sufficiently robust that it may detect and respond to problems without significantly impacting users. Frequently, efforts to ensure a computer network is consistently online for its users may be referred to as maintaining "high availability". A computer network which has in place mechanisms which prevent hardware or software problems from impacting its users may be referred to as a High Availability Network (HAnet). Some of the characteristics which may be considered when defining a HAnet include protection of data (Reliability), continuous access to data (Availability), and techniques for correcting problems which minimally impact users (Serviceability). Collectively these characteristics are frequently referred to as RAS.

In some cases it is desirable to create a computer network which includes a two node Local Area Network (LAN). For example, it may be desirable to have a two node LAN consisting of a database server and its corresponding application server. These servers may be connected to each other using a well known method using crossover cables. A crossover cable is a cable that is used to connect two computers by reversing their respective pin contacts. Using crossover cables may have the advantage of being highly secure, performing well, and eliminating several components typically present in a computer network, such as switches and routers, which could cause a failure. However, while such a configuration may improve reliability and availability in the system, it does not address serviceability and still contains single points of failure. For example, failure of either of the server network interfaces to which the crossover cable is connected will cause the network to be unavailable. Also, failure of the crossover cable itself would result in unavailability of the network.

In some cases, mechanisms may be put in place which detect an error in a network connection and notify the system administrator that a problem exists. The system administrator may then take corrective action, such as switching to a previously installed redundant resource. However, such mechanisms typically take some period of time and necessarily involve interruptions in network operation. In other cases, operating system specific mechanisms may be implemented which may facilitate a failover to a redundant connection. Typically these mechanisms operate at layers below the application layer of the protocol stack. Two widely recognized protocols include TCP/IP and ISO/OSI, each of which include a highest layer referred to as the application layer. Other communication protocols with a layer corresponding to the application layer may utilize a different name. Generally, those layers below the application layer involve software and mechanisms which are not portable across different operating systems. Consequently, these solutions are not portable and generally require a newly created mechanism for each platform on which a failover is desired.

In addition to the problems described above, certain network nodes may be configured such that certain operations are not permitted after startup. For example, firewalls may contain certain restrictions on the activities which may be performed after the firewall has already booted. Because of the security oriented nature of firewalls, certain operations which may be permitted on a non-firewall server may not be permitted on a firewall server. For example, in certain firewall implementations, all interfaces must be defined when the system is started and all interfaces must be kept defined at all times in order to prevent security breaches. In such a system, establishing a new network interface after boot may be seen as a hostile act by a firewall server and may cause the firewall server to shut down. Consequently, if a system administrator is notified of a network connection failure in such a system and attempts to establish a new network connection, the system may shut down all communications.

SUMMARY OF THE INVENTION

The problems outlined above are in large part solved by a method and mechanism as described herein. A method and mechanism failover with warm standby is described. The method and mechanism include the addition of a redundant, secondary, network connection which may be utilized in the event of a failure of a primary connection. By utilizing an Application layer mechanism which configures a secondary network connection with dummy parameters, monitors the primary network connection, automatically detects a failure in the primary connection, and switches to the secondary connection in a short period of time, network availability may be maintained. Advantageously, network interruptions may be minimized and servicing of network problems may be automated by a mechanism which is portable across multiple platforms. Further, because the mechanism operates within the application layer of the communication protocol, no modification of existing operating software is necessary.

Broadly speaking, a method for maintaining high availability in a two node computer network is contemplated. The method includes adding an Application layer High Availability Networking (HAnet) mechanism to a node of the network, adding a second network connection, configuring a backup interface with a set of dummy configuration parameters and disabling it, monitoring a first network connection, detecting a failure of the first network connection, and performing a failover from the first network connection to the second network connection. The monitoring, configuring, failure detection, and failover are all performed by the HAnet mechanism.

Also contemplated is a network node which includes a first network interface, a second network interface, and a High Availability Networking (HAnet) mechanism. The included HAnet mechanism operates at the Application layer and is configured to configure a backup interface with dummy parameters and monitor the first network interface.

If a failure of the first network interface is detected, the HAnet mechanism is configured to perform a failover from the first network interface to the second network interface.

Further contemplated is a computer network configured to maintain high availability. The network includes a first node coupled to a second node by two connections. The first node includes a High Availability Networking (HAnet) mechanism which operates at the Application layer. The HAnet mechanism is configured to configure a backup interface of the first node with dummy parameters, monitor the first connection and perform a failover from the first connection to the second connection in response to detecting a failure of the first connection.

BRIEF DESCRIPTION OF THE DRAWINGS

Other objects and advantages of the invention will become apparent upon reading the following detailed description and upon reference to the accompanying drawings in which.

Figure 1:
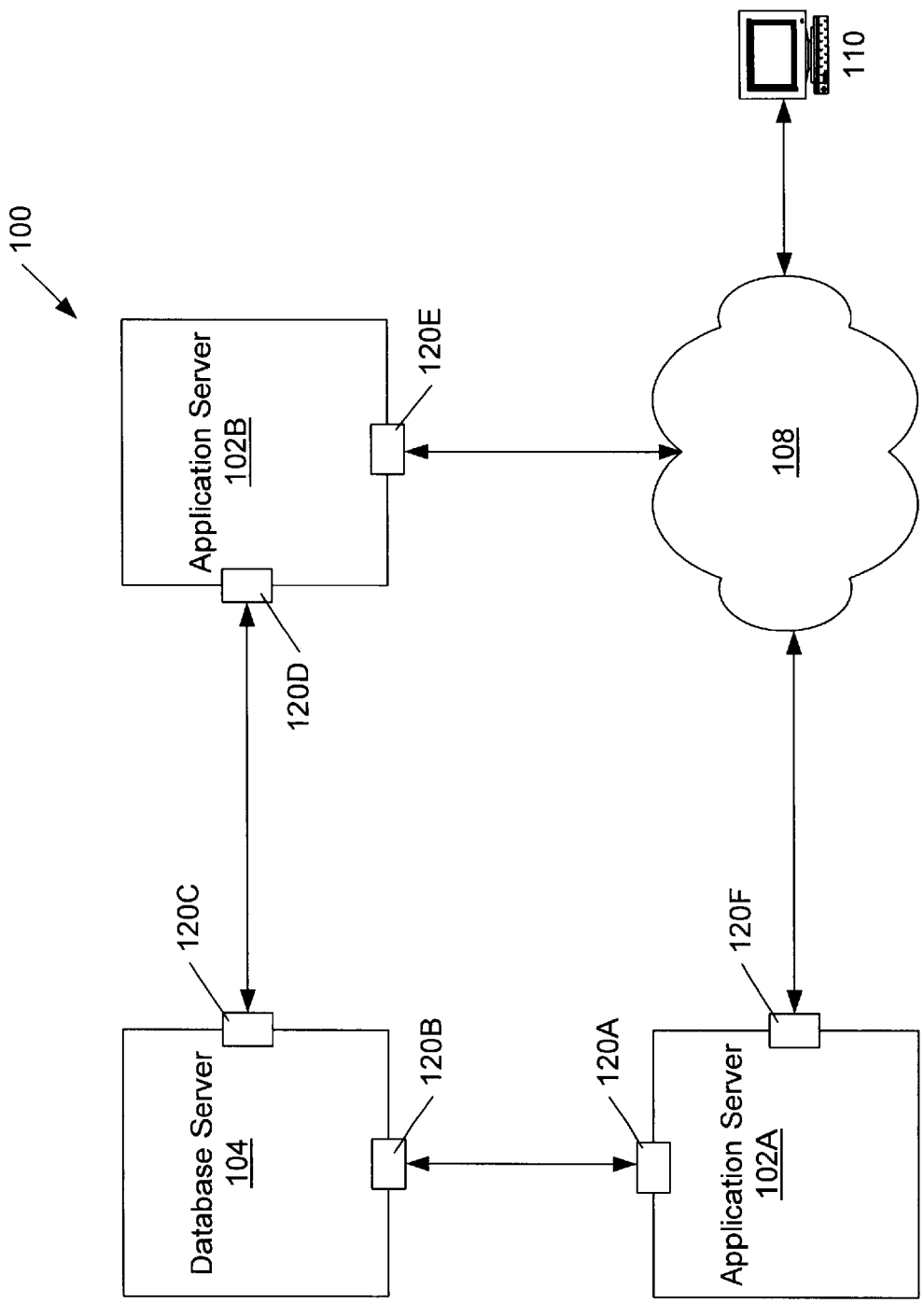
FIG. 1 is a diagram of a computer network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Computer Network Overview

FIG. 1 is an illustration of a computer network 100. Included in computer network are database server 104, application server 102A, application server 102B, network infrastructure 108, and workstation 110. Database server 104 is coupled to application servers 102A and 102B. Application server 102A and 102B are further coupled to network infrastructure 108. Workstation 108 is also coupled to network infrastructure 108. In addition, database server 104 includes network interfaces 120B and 120C, application server 102A includes network interfaces 120A and 120F, and application server 102B includes network interfaces 120D and 120E. Elements referred to herein with a particular reference number followed by a letter will be collectively referred to by the reference number alone. For example, interfaces 120A–120F will be collectively referred to as interfaces 120. In one embodiment, interfaces 120 are network interface cards (NIC).

In computer network 100 of FIG. 1, users may access the network 100 via workstations, such as workstation 110, coupled to network infrastructure 108. In one embodiment, a user on a workstation 110 may interact directly with a "front-end" interface, which in turn communicates with an application on application server 102A. The application on application server 102A may then access required data from data base server 104. Application server 102A may be viewed as in intermediary between the front-end workstation 110 and the back-end database 104. By acting as an intermediary, application server 102A prevents users from directly accessing database server 104 and may better balance the load on database server 104. While there are advantages to utilizing the two node structure of application server 102A and database server 104, having a single connection between the two includes the existence of "single points of failure" as discussed in FIG. 2. A single point of failure may be described as a point in the network, for example a device or connection, which has no backup and whose failure will cause an interruption in network service.

Figure 2:
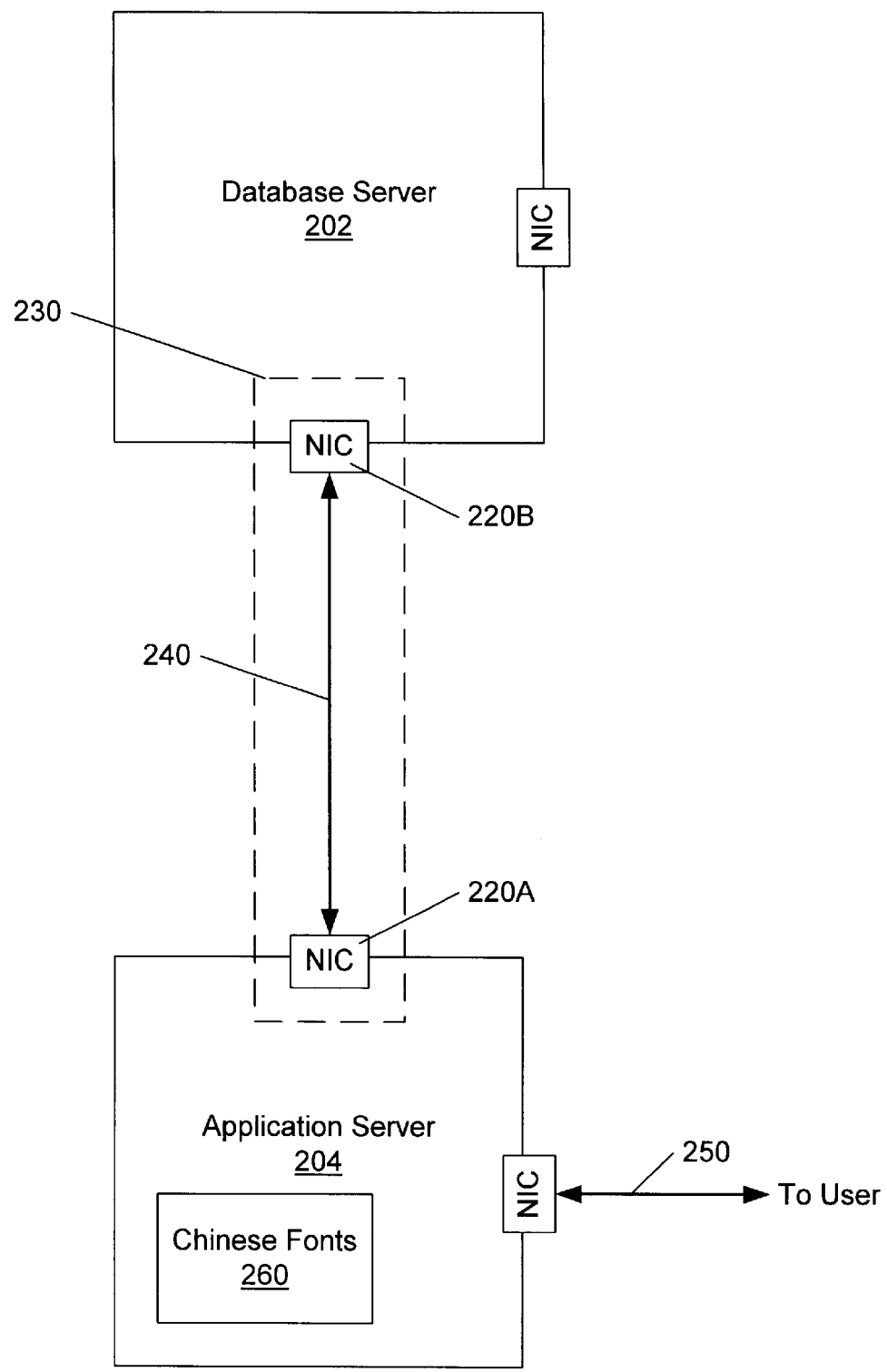
FIG. 2 is a diagram of a two node local area network.

FIG. 2 is an illustration of a two node network. Included in FIG. 2 are database server 202 and application server 204. Database server 202 includes NIC 220B. Application server 204 includes NIC 220A and 220C. In addition, application server 204 includes Chinese font application 260. NIC 220A is coupled to NIC 220B via interconnect 240. In one embodiment, interconnect 240 is a crossover cable. In the example of FIG. 2, a user may access application server 204 via interconnect 250. A user may require access to application server 204 for the purpose of utilizing Chinese font application 260. In communicating with a user, application server 204 may access database server 202.

As shown in FIG. 2, there exists a single interconnect 240 between application server 204 and database server 202. If that single interconnect 240 fails, communication between application server 204 and database server 202 will be lost. Likewise, if either interface NIC 220A or NIC 220B fails, communication between application server 204 and database server 202 will be lost. Consequently, each of these components 240, 220A and 220B represents a single point of failure as described above. Further, because there is no backup connection between server 202 and 204, if this single connection 230 fails the only solution is to replace or repair the defective component. In any event, the failure of this single connection 230 will result in interruption of network service. In order to address this problem, a redundant connection may be introduced as discussed in the following.

Figure 3:
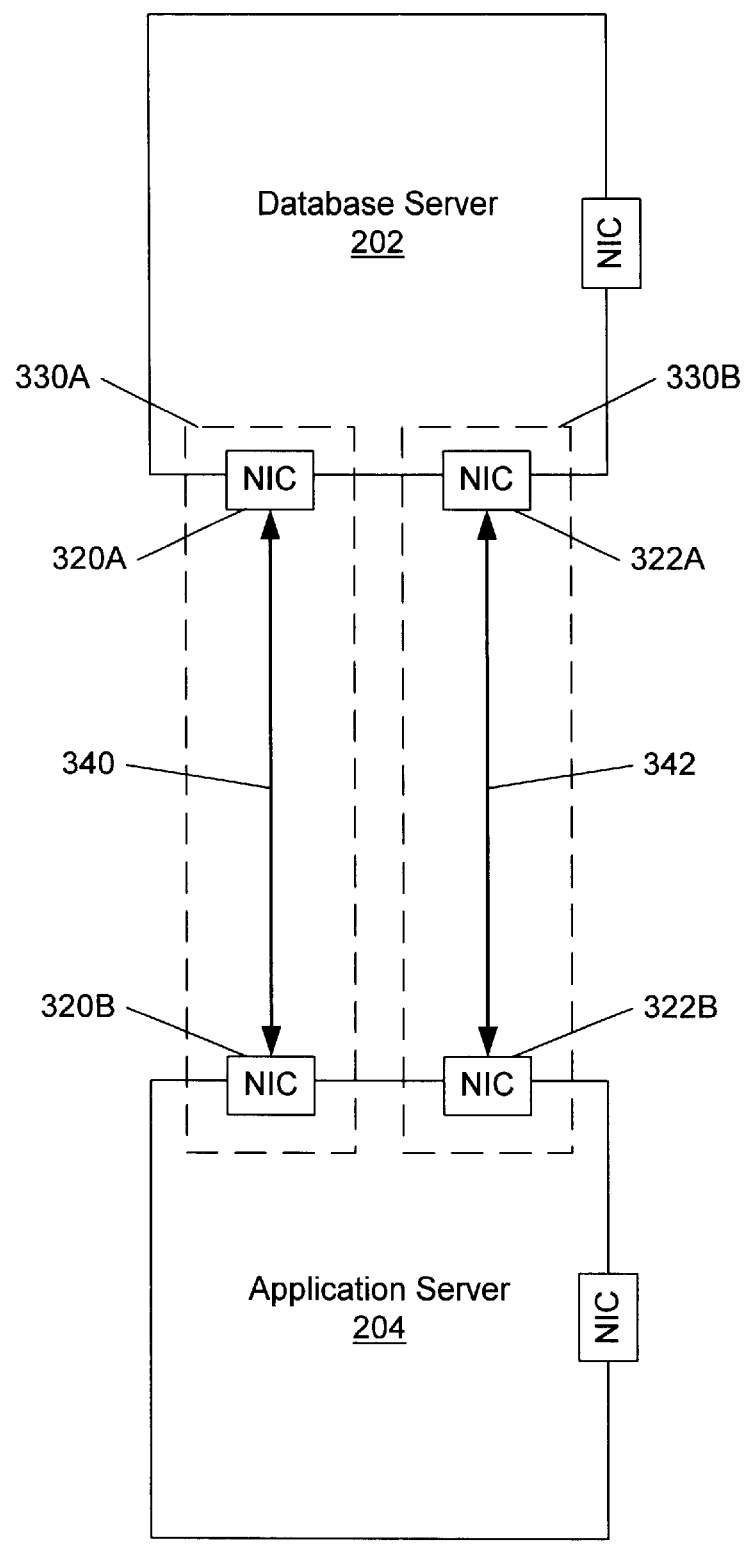
FIG. 3 is a diagram of a two node network with a redundant connection.

FIG. 3 is an illustration of a two node network which includes a redundant connection. Included in the network are a primary connection 330A and a secondary connection 330B. Primary connection 330A includes NIC 320A, NIC 320B, and interconnect 340. Secondary connection 330B includes NIC 322A, NIC 322B, and interconnect 342. In one embodiment, primary connection 330A serves to transmit communications between database server 202 and application server 204. If a failure of connection 330A occurs, connection 330B may be utilized to communicate between servers 202 and 204. By incorporating secondary connection 330B, the single point of failure that exists in a single connection network as described above is eliminated. However, in order to avoid interruptions in network service, secondary connection 330B must be able to assume the functions of primary connection 330A in a very short period of time. If a failure of primary connection 330A occurs and secondary connection 330B does not assume the functions of primary connection 330A very rapidly, users will experience network service interruption. In the following discussion, a failover method is described which provides for high availability and serviceability.

Network Protocol and Addressing Overview

A well known communications protocol for networking is the Transmission Control Protocol/Internet Protocol (TCP/IP) communications protocol. In general, each host connected to a network has an assigned logical address, or Internet Protocol (IP) address. When one host wishes to convey data to another host, packets are formed which contain the data and the IP address of the destination host and the packets are then delivered to the desired destination. Necessarily, each host must have a unique IP address. Each IP address is a sequence of digits comprised of two basic parts, a network ID and a host ID. The network ID identifies devices which are located on the same physical network. The host ID is used to identify a particular host within a network. A second address which may be associated with a host is a subnet mask. A subnet mask is used to divide a larger network into smaller sub-networks. Frequently, network administration may be simplified by carefully defining sub-networks for a network. A subnet mask includes a sequence of digits similar to an IP address and is used to indicate which part of an EP address corresponds to a network ID and which part corresponds to host ID. A third address used in the EP protocol is a broadcast address. The broadcast address may be used by a host to convey data to all other hosts on a network simultaneously, as opposed to sending data to a targeted host with its unique EP address. Finally, each host interface includes a physical, or Media Access Control (MAC), address. The MAC address is typically configured at the time of manufacture of the interface. In one embodiment, interface MAC addresses may be specified by the host of which they are a part. In such a case, a host with multiple interfaces may specify the same MAC address for all interfaces. In an alternative embodiment, each interface on a given host may have a different MAC address. Because packet delivery is handled at the physical layer and IP addresses are only logical addresses, IP addresses must be converted to corresponding MAC addresses. IP uses the well known Address Resolution Protocol (ARP) to build a table in memory which maps IP addresses to corresponding MAC addresses. By referencing this table, physical addresses corresponding to IP addresses may be determined.

In the UNIX™ operating system, network interface configuration may be done using the well known "ifconfig" command. Among other things, the ifconfig command allows the configuration of an interface's IP address, subnet mask, and broadcast address. The basic syntax for ifconfig is typically as follows:

ifconfig [interface] [command] [address] [options]

where "interface" is the name of the interface, "command" includes a variety of command which depends on the particular version of the UNIX™ operating system being run, "address" is either a host name or address expressed in typical dot notation, and "options" may be any of a number of configuration options. Some of the options which may be specified are "up", "down", "netmask", "broadcast", and "plumb". The plumb option is used to setup and open the streams necessary for TCP/IP to use the interface. The broadcast option is used to configure a broadcast address. The netmask option is used to establish the subnet mask for the interface. The down option prevents the system from communicating through the interface. Finally, the up option enables the interface for communication. For example, the following command may be used to assign the IP address 172.16.1.2 to the interface named le0:

ifconfig le0 inet 172.16.1.2.

Another well known utility in the UNIX™ operating system is the "ping" command. The ping command uses timed IP/ICMP ECHO_REQUEST and ECHO_REPLY packets to probe the "distance" to a target machine. By examining packets received from the target machine, communication latency may be determined. In one embodiment, the ping utility may be used to determine if a particular network connection is operational. This use is sometimes referred to as a "heartbeat", for it indicates whether or not a particular node or connection is "alive". For example, one node on a network may use the ping command to periodically send requests to another node over a particular network interface. As long as a corresponding reply is received, it may be assumed that the connection is working. If no reply is received, the connection may no longer be operational and corrective action may be required. In addition to the ping utility, other similar types of request/reply communication utilities may be used to test network connections as well. As an alternative to using the ping utility, some NICs are configured to maintain a status of the network connection to which they are connected. Such a status may be indicated by a status register within the NIC itself. By polling this status register, such as through device driver calls, a node may detect whether or not a particular connection is operational. By utilizing a network interface configuration utility such as "ifconfig", and monitoring a network connection, a mechanism for maintaining high availability may be created as described by the following.

Figure 4:
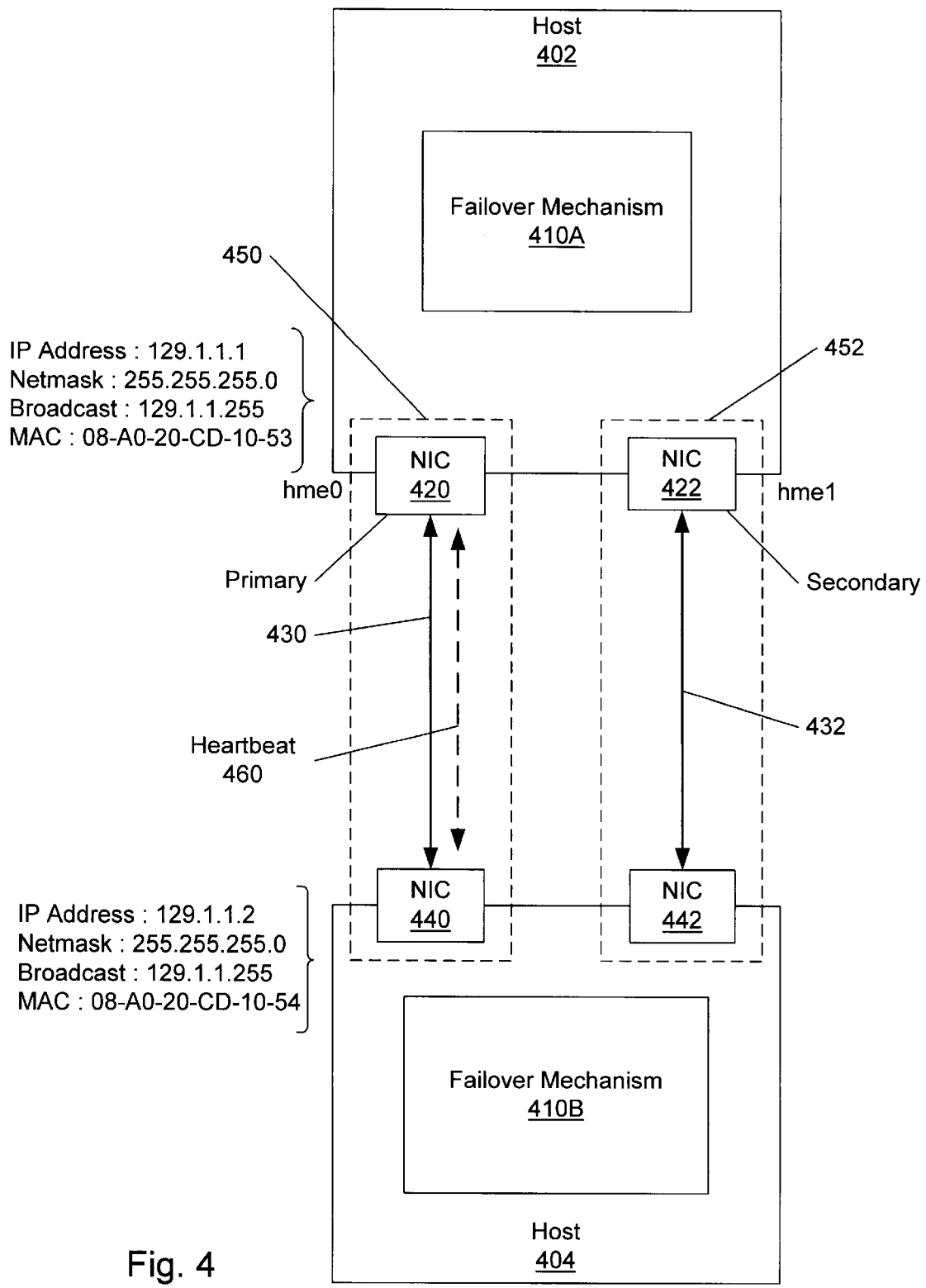
FIG. 4 is a diagram of a two node network with a failover mechanism.

FIG. 4 is a diagram of one embodiment of a computer network including host 402, host 404, primary connection 450 and secondary connection 452. Host 402 includes interfaces hme0 and hme1, NIC 420, NIC 422, and failover mechanism 410 A. In one embodiment, failover mechanism 410 includes software running at the application layer of the communications protocol. Host 404 includes NIC 440, NIC 442 and failover mechanism 410B. Interface hme0 is a primary interface and hme1 is a secondary interface. NIC 420 is coupled to NIC 440 via connection 430 and NIC 422 is coupled to NIC 442 via connection 432. In one embodiment, NIC 420, NIC 422, NIC 440 and NIC 442 are Ethernet adapters. Fast Ethernet, Gigabit Ethernet, or any other suitable network adapters may be utilized as well. In order to support the TCP/IP protocol, network adapters such as 420 and 422 may be configured using the ifconfig utility as described above. Primary interface hme0 is configured with an IP address of 129.1.1.1, a Netmask of 255.255.255.0, a Broadcast address of 129.1.1.255 and a MAC address of 08-A0-20-CD-10-53. Secondary interface hme1 is "cold", or "unplumbed", and is not configured. The interface corresponding to NIC 440 is configured with an IP Address of 129.1.1.2, Netmask of 255.255.255.0, Broadcast address of 129.1.1.255, and MAC address of 08-A0-20-CD-10-54. The interface corresponding to NIC 442 is not plumbed. In the embodiment shown, the MAC addresses of NIC 420 and NIC 422 are determined by host 402 and are the same. The MAC addresses of NIC 440 and 442 may determined by host 404 and are the same.

In one embodiment, failover mechanism 410A is configured to monitor primary connection 450 by utilizing a heartbeat 460. Failover mechanism 410A monitors this heartbeat 460 by periodically "pinging" host 404 by sending packets over NIC 420 to host 404 via connection 430. Host 404 replies to these packets received from host 402 by sending reply packets over NIC 440 to host 402 via connection 430. If host 402 receives a reply from host 404, failover mechanism 410A is configured to detect primary connection 450 is operational. However, if failover mechanism 410A detects a failure in heartbeat 460 (e.g., no reply packets received from host 404), failover mechanism 410A is configured to perform a failover to secondary connection 452. In a similar manner, failover mechanism 410B may be configured to monitor primary connection 450 by monitoring heartbeat 460. Failover mechanism may be configured to detect a failure in primary connection 450 when no packets are received from host 402 via connection 450. In order to perform failover from connection 450 to connection 452, failover mechanism 410A may take down NIC 420, stop monitoring primary connection 450 and utilize the ifconfig command to plumb NIC 422 and configure NIC 422 with the parameters corresponding to NIC 420. Likewise, failover mechanism 410B may detect a failure in primary connection 450 and perform a failover to secondary connection 452. Failover mechanism 410A may include the following commands to perform the failover:

pause_monitor
ifconfig hme0 unplumb
ifconfig hme1 plumb
ifconfig hme1 inet 129.1.1.1 netmask 255.255.255.0 broadcast 129.1.1.255 up
resume_monitor Upon detecting a failure, the failover routine is called and monitoring of the primary connection 450 is paused. The first ifconfig command above "unplumbs" interface hme0 so that host 402 will not attempt to use it for communications. The second ifconfig command above "plumbs" interface hme1 and sets up the TCP/IP streams needed for host 402 to use this interface. The third ifconfig command above configures interface hme1 with the parameters corresponding to hme0. Interface hme1 is configured with the IP address 129.1.1.1, subnet mask 255.255.255.0, and the broadcast address 129.1.1.255. The "up" parameter brings interface hme1 up so that it may be used by host 402 for communications. Upon completion of the failover to the new interface, monitoring of the network connection is resumed. Because NIC 420 and NIC 422 have the same MAC address, there is no need to transfer the MAC address of NIC 420 to NIC 422. Failover mechanism 410B may utilize a similar set of commands to perform failover to secondary connection 452. Advantageously, the connection failure is transparent to clients of the node and the network connection is maintained. Further, because failover mechanism 410 operates at the application layer, it is not necessary to modify the operating system, drivers, or network software of host 402 or host 404. Advantageously, failover mechanism 410 is portable and may be easily implemented in a wide variety of systems running a variety of operating systems. In one embodiment, upon completing a failover to secondary connection 452, monitoring of secondary connection 452 begins and a failover to primary connection 450 may be initiated in the event secondary connection 452 fails. Further, in one embodiment it may be necessary to "unplumb" primary connection 450 prior to plumbing secondary connection 452.

In one embodiment, failover mechanism 410 may include a configuration file specifying a delay parameter. The delay parameter may indicate a specified period of time a host is to wait before checking network connectivity. In this manner, both hosts 402 and 404 may have time to perform failover before one begins communicating again. Were one host to begin communicating prior to completion of failover by both, the network connection may appear inoperable to the transmitting host and another failover may be initiated.

Figure 5:
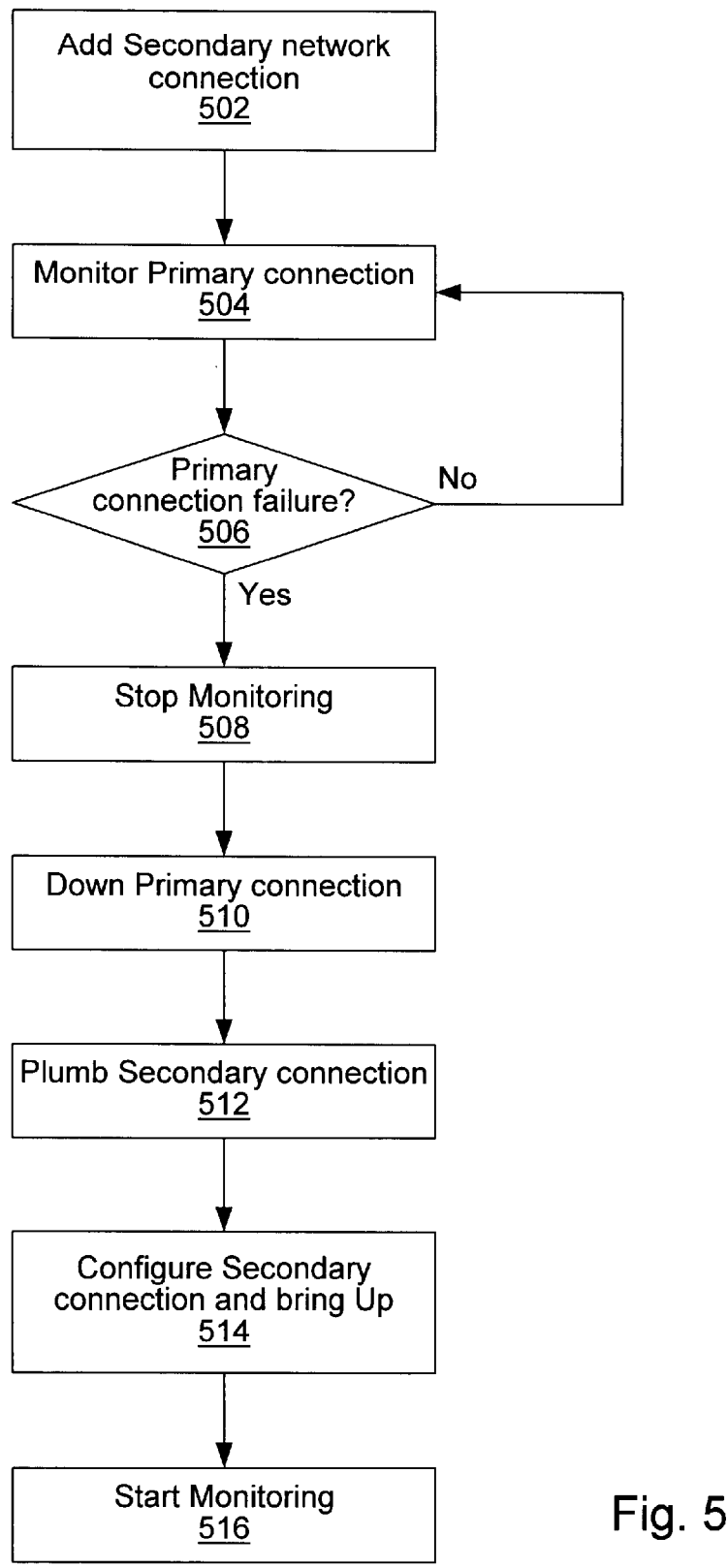
FIG. 5 is a diagram of a flowchart illustrating a failover method.

FIG. 5 is a flowchart illustrating a failover method. Initially, a secondary network connection is added to a two node LAN (block 502). This newly added connection includes an additional NIC added to each node and a crossover cable coupling the new NICs together. The primary network connection is then monitored for failure (block 504). Such monitoring may include using a ping utility or polling a status register of the corresponding NIC. If no failure of the primary connection is detected (decision block 506), monitoring of the primary connection continues (block 504). If a failure of the primary connection is detected (decision block 506), monitoring of the primary connection is stopped (block 508), the primary connection is brought down (block 510) and the secondary connection is plumbed (block 512). Finally, the secondary connection is configured with the parameters of the primary connection and is brought up (block 514), and monitoring of the newly enabled connection is started (block 516).

Firewalls

A firewall is a well known technology which provides for restricted communications between separate networks. Firewalls are frequently used by an enterprise to control access of those on an outside network, such as the Internet, to the enterprise's inner network. Firewalls may also be used to protect some parts of an inner network from other parts of an inner network. Firewalls typically use a complex set of predefined rules which are applied to communications between networks. Firewalls generally attempt to match an incoming or outgoing communication and service with one of the predefined rules. If a rule match is found, the communication may be either accepted or rejected.

Figure 6:
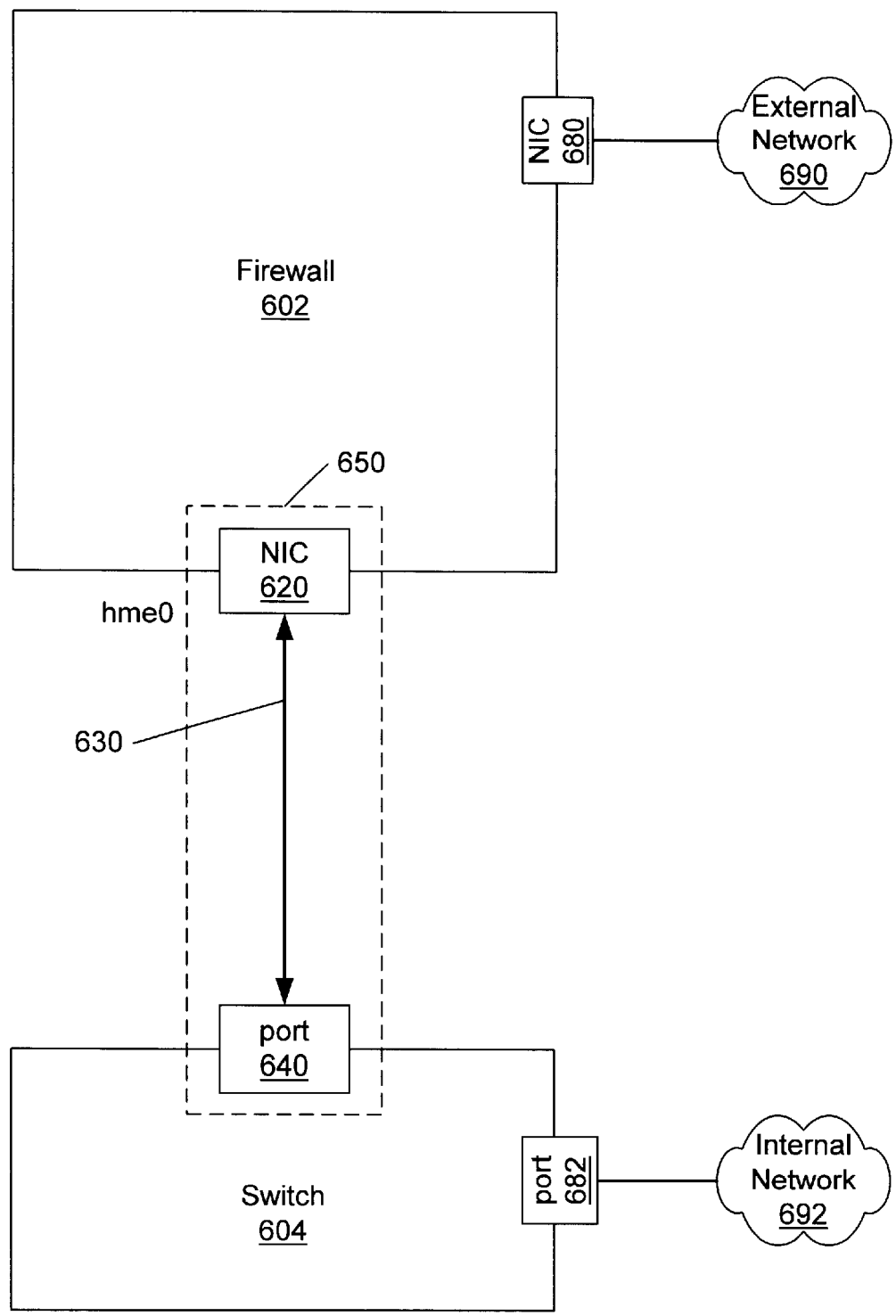
FIG. 6 is a diagram of a computer network with a firewall.

FIG. 6 is a diagram illustrating a computer network with a firewall. FIG. 6 includes an external network 690, firewall 602, switch 604, and internal network 692. Firewall 602 includes NIC 620 and NIC 680. Switch 604 includes port 640 and port 682. External network 690 is coupled to firewall 602 through NIC 680. Internal network 692 is coupled to switch 604 through NIC 682. NIC 620 is coupled to port 640 via interconnect 630. In general, firewall 602 controls communications between the external network 690 and the internal network 692. In a typical configuration, internal network 692 may be a LAN within a company and external network 690 may represent a network outside the company. By placing the firewall between the external network 690 and the internal network 692, communications may be controlled and security enhanced. As shown in FIG. 6, there is a single connection 650 between firewall 602 and switch 604. If connection 650 were to fail, communication between internal network 692 and external network 690 would be lost. Connection 650 represents a single point of failure. To eliminate this single point of failure and provide for high availability, a failover mechanism as discussed below may be utilized.

Figure 7:
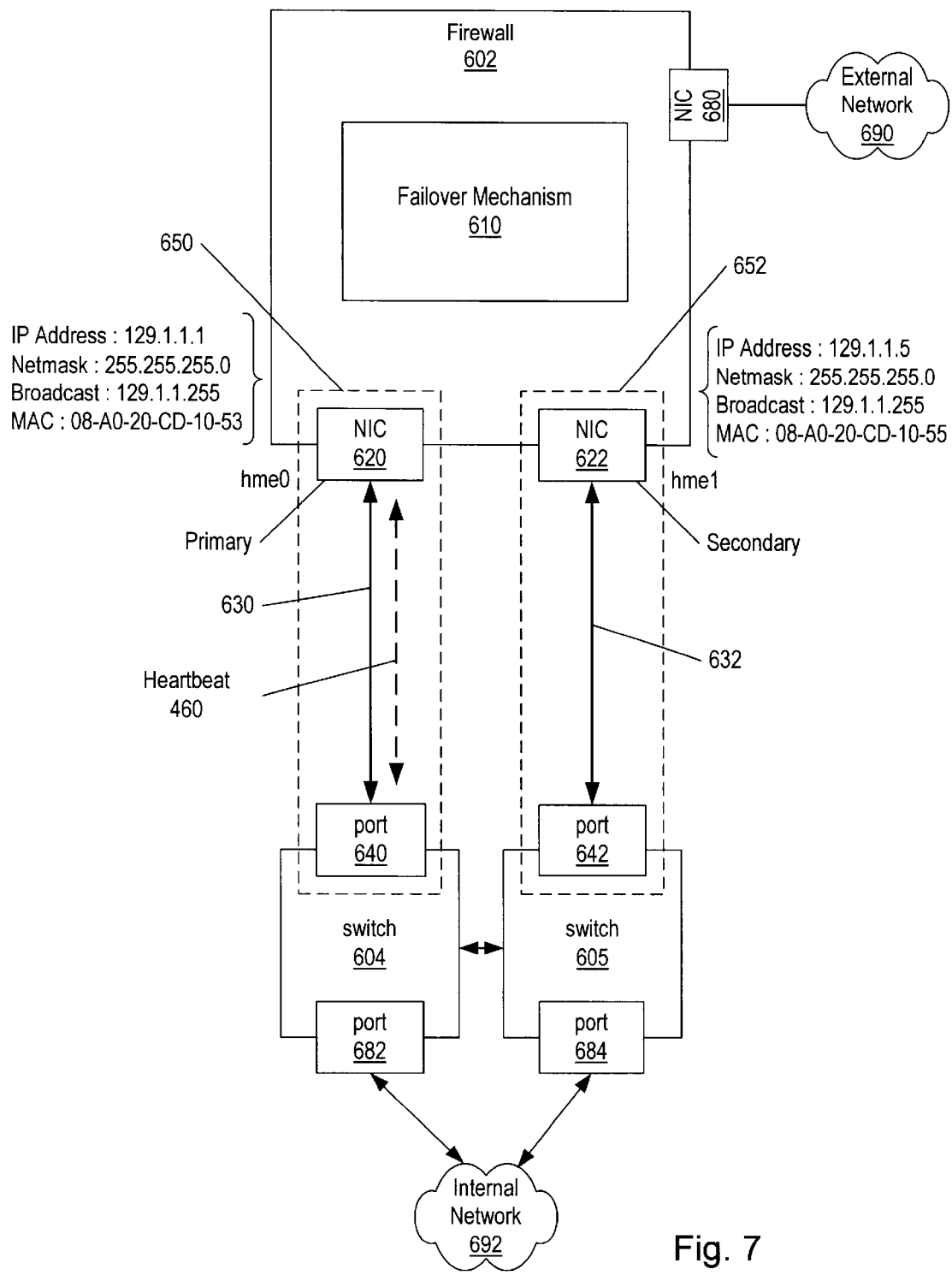
FIG. 7 is a diagram of a computer network with a firewall and failover mechanism.

FIG. 7 is a diagram illustrating a computer network with a firewall and an added redundant connection. FIG. 7 includes an external network 690, firewall 602, switch 604, switch 605 and internal network 692. Firewall 602 includes failover mechanism 610, NIC 620, NIC 622 and NIC 680. Switch 604 includes port 640 and port 682. Switch 605 includes ports 642 and 684. External network 690 is coupled to firewall 602 through NIC 680. Internal network 692 is coupled to switch 604 through port 682 and switch 605 through port 684. NIC 620 is coupled to port 640 via interconnect 630. NIC 622 is coupled to port 642 via interconnect 632. Switches 604 and 605 are coupled to each other. Connection 650 represents a primary connection between firewall 602 and switch 604. Connection 652 represents a secondary connection between firewall 602 and switch 604.

Because of the security oriented nature of firewalls, certain operations which may be permitted on a non-firewall server may not be permitted on a firewall server. For example, in certain firewall implementations, all interfaces must be defined when the system is started and all interfaces must be kept defined at all times in order to prevent security breaches. In such an implementation, plumbing an interface after boot may be seen as a hostile act by a firewall server and may cause the firewall server to shut down. Consequently, if the interface corresponding to NIC 622 is plumbed after firewall 602 has started, firewall 602 may shut down all communications between external network 690 and internal network 692. Further, if interfaces corresponding to both NIC 620 and 622 are plumbed at startup, they may both have the same MAC address which may not be permissible.

In order to implement a failover mechanism for a system such as firewall 602, the following method may be used. A redundant connection 652 is added as described above. On startup of firewall 602, failover mechanism 610 defines all interfaces. Failover mechanism 610 plumbs and configures NIC 620, NIC 622, and NIC 680. NIC 620 and NIC 680 are plumbed and configured with the actual parameters to be used in network communication. However, NIC 622 is plumbed and configured with dummy IP addresses and a dummy MAC address. Upon configuring NIC 622 with the dummy parameters, NIC 622 is immediately brought down by failover mechanism 610. In this manner, all interfaces may be defined at startup, but there is no conflict between EP addresses or MAC addresses. In this case, the secondary connection may be deemed a "warm" standby as it is already plumbed and configured, but not "up" or active. As shown in FIG. 7, the following exemplary interface parameters are indicated:

| Interface | NIC 620 | NIC 622 |
|---|---|---|
| Parameters | IP Address : 129.1.1.1 | IP Address : 129.1.1.5 |
| | Netmask : 255.255.255.0 | Netmask : 255.255.255.0 |
| | Broadcast : 129.1.1.255 | Broadcast : 129.1.1.255 |
| | MAC : 08-A0-20-CD-10-53 | MAC : 08-A0-20-CD-10-55 |

In order to perform the failover from primary connection 650 to secondary connection 652, a method similar to that discussed in FIG. 4 may be used. Utilizing a heartbeat or similar mechanism, a failure of the primary connection 650 may be detected by failover mechanism 610. Assuming failover mechanism 610 initially detects the failure of primary connection 650, failover mechanism 610 stops monitoring primary connection 650. NIC 620 is then brought down. NIC 622 is then configured using ifconfig with the parameters which are currently assigned to NIC 620 and NIC 620 is configured with the dummy parameters which were associated with NIC 622. NIC 622 is then brought up. Failover mechanism 610 may then monitor connection 652 as the new primary connection and have connection 650 serve as the new secondary connection. In the event connection 652 fails, a failover to connection 650 may be done. In alternate embodiments, firewall 602 may be coupled to another host which has a failover mechanism. In such a case, as discussed above, a configuration file may be utilized which includes a delay parameter to ensure both firewall 602 and the coupled host have completed failover before resuming communications. Advantageously, network configurations which include security mechanisms such as firewalls may include the above described failover mechanism and high availability may be attained.

Increasing Bandwidth

Figure 8:
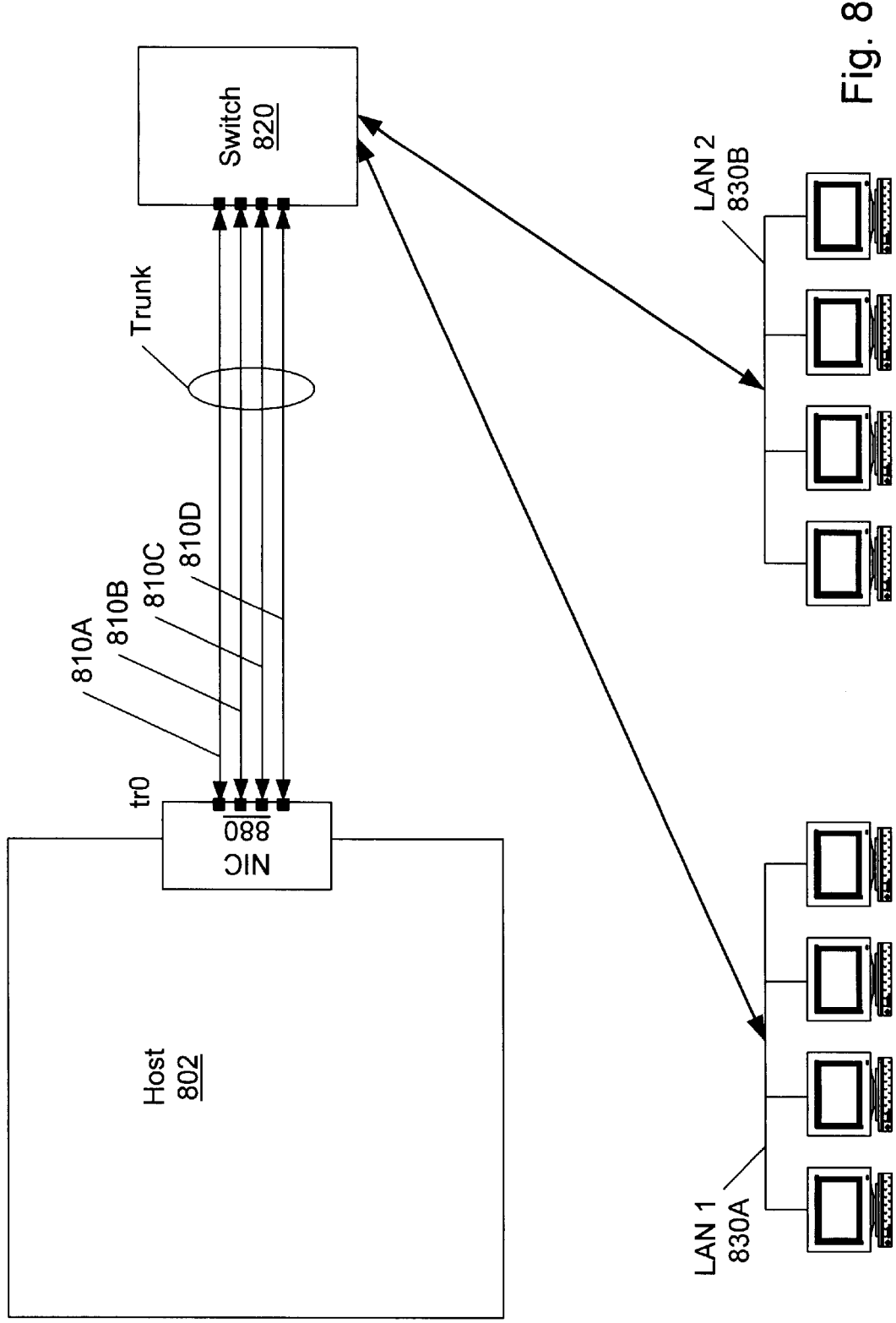
FIG. 8 is a diagram of a computer network with trunking.

Because of the ever increasing demands placed on networks today, ways of increasing network bandwidth are of frequent concern. While Fast Ethernet and Gigabit Ethernet may serve to improve performance, the use of such technologies necessitate the need for an even greater increase in backbone capacity. One well known technique used to increase bandwidth is called "trunking". Trunking is a technology which may provide dramatic increases in network performance. Using trunking technology, multiple ports may be combined into a single logical port creating a single, high speed, logical link. FIG. 8 is an illustration of a network utilizing trunking to boost throughput and reduce network latency. Included in FIG. 8 are host 802, switch 820, LAN 1 830A and LAN 2 830B. Host 802 includes a four port NIC 880. NIC 880 is coupled to switch 820 via links 810A–810D. In one embodiment, each of links 810A–810D represent Fast Ethernet connections. Switch 820 is further coupled to LAN 1 830A and LAN 2 830B.

While NIC 880 has four ports, all four ports may be configured to act as a single logical port. Consequently, switch 820 may utilize any of the four ports to convey data to host 802. In one embodiment, connections 810 may be utilized in a round robin order. In this manner, links 810 may be viewed as a single connection with four times the capacity of any individual connection 810A–810D. Because all four ports of NIC 880 may be viewed as a single logical port, data communicated from LAN 1 830A or LAN 2 830B to host 802 has four possible connections upon which to be conveyed. In addition to increasing the bandwidth between Host 802 and switch 820, the availability of additional connections provides for redundancy as well. If one of connections 810 were to fail, the failed connection may be disabled and the remaining connections may continue service. In this manner, availability of the connection between Host 802 and LANs 830 may be maintained.

Figure 9:
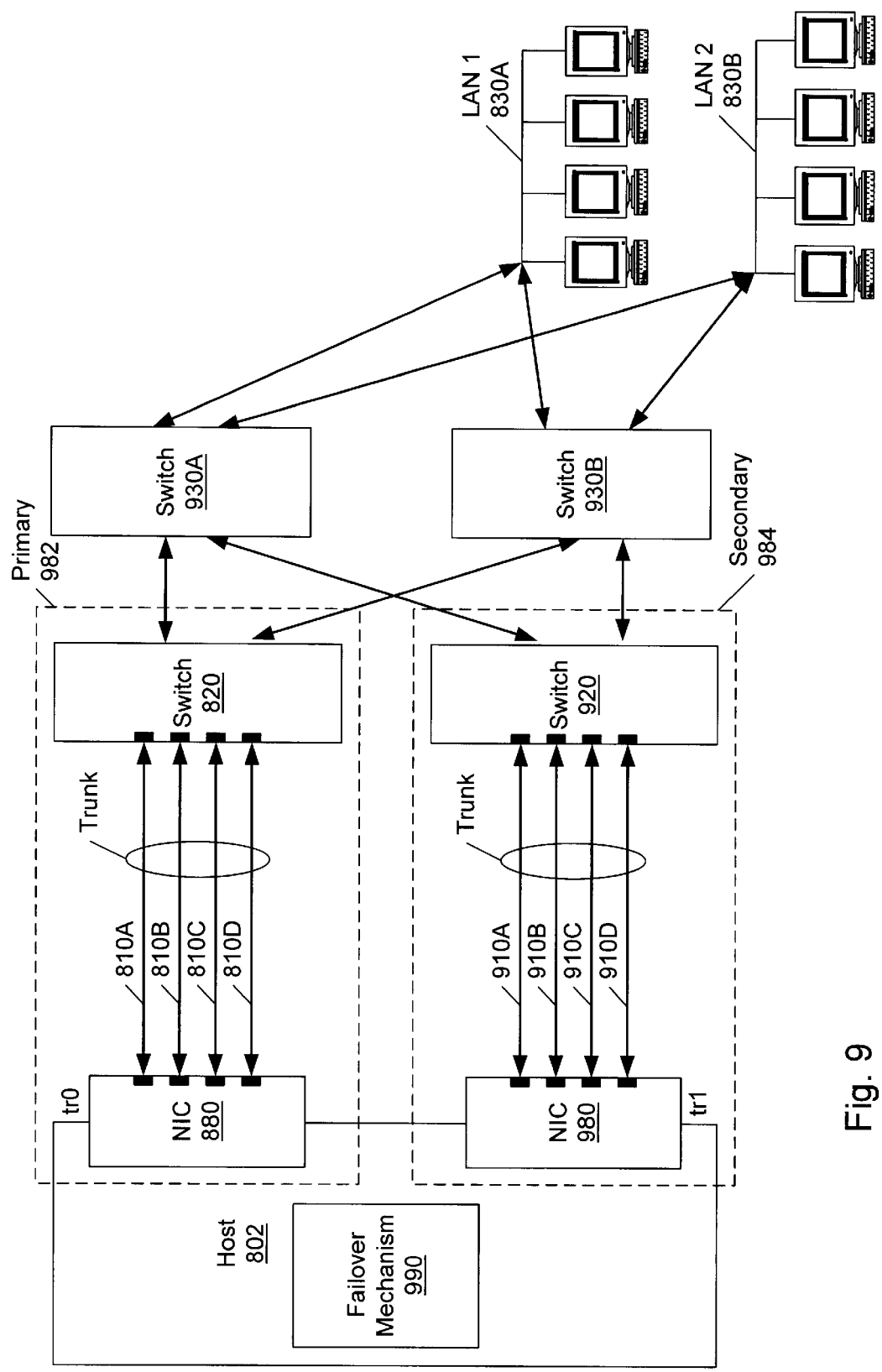
FIG. 9 is a diagram of a computer network with trunking and a failover mechanism.

While trunking provides for increased bandwidth and redundancy, there still exists single points of failure. Because all four ports of NIC 880 must be connected to the same switch 820, a single point of failure is introduced. For example, if Switch 820 fails, communication between Host 802 and LANs 830 will be lost. Further, if NIC 880 were to fail, communication between Host 802 and LANs 830 would be lost. In order to eliminate single points of failure and maintain high availability, a failover method as described in the following may be introduced. FIG. 9 is a diagram of a network which includes trunking and a failover mechanism. Included in FIG. 9 are host 802, switches 820, 920, 930A, 930B, and LANs 830A and 830B. Host 802 includes NIC 880 coupled to switch 820, and NIC 980 coupled to switch 920. Switch 820 and Switch 920 are further coupled to switches 930. LANs 830 are each coupled to both switch 930A and 930B. Host 802 also includes failover mechanism 990. NIC 880, connection 810, and switch 820 represent a primary connection 982. NIC 980, connection 910, and Switch 920 represent a secondary connection 984.

In ordinary operation, primary connection 982 handles all network traffic between host 802 and LANs 830. In one embodiment, NIC 980 is initially unplumbed and unconfigured. NIC 880 may be configured as described above using the ifconfig command. Failover mechanism 990 may be configured to monitor primary connection 810 using a heartbeat, status register polling or other similar technique. In one embodiment, failover mechanism 990 is configured to monitor the operational status of each of the four ports 810A–810D of NIC 880. If failover mechanism 990 detects a failure of one of connections 810A–810D, a failover to secondary connection 984 may be commenced. In the embodiment shown, primary NIC 880 tr0 is configured with an IP address of 129.1.1.1, a Netmask of 255.255.255.0 and a Broadcast address of 129.1.1.255. Secondary NIC 980 is unplumbed. Both NIC 880 and NIC 980 have a MAC address of 08-A0-20-CD-10-53. Assuming NIC 880 has the designation tr0 and NIC 980 has the designation tr1, the following commands may be used to perform the failover.

tr_config stop tr0
tr_config define tr1
tr_config tr1 129.1.1.1 netmask 255.255.255.0 broadcast 129.1.1.255 up
tr_config start_trunk_monitor Upon detecting a failure, tr_config stop tr0 stops failover mechanism 990 from monitoring primary connection 982 and unplumbs tr0. The second tr_config command above "plumbs" interface tr1 and sets up the TCP/IP streams needed for host 802 to use this interface. The third tr_config command above configures interface tr1 with the parameters corresponding to tr0. Interface tr1 is configured with the IP address 129.1.1.1, subnet mask 255.255.255.0, and the broadcast address 129.1.1.255. The "up" parameter brings interface tr1 up so that it may be used by host 802 for communications. Finally, the failover switch procedure returns and failover mechanism 990 begins monitoring secondary connection 984. Because NIC 880 and NIC 980 have the same MAC address, there is no need to transfer the MAC address of NIC 880 to NIC 980. Advantageously, the connection failure is transparent to clients of the node and the network connection is maintained. Further, because failover mechanism 990 operates at the application layer, it is not necessary to modify the operating system, drivers, or network software of host 802. Advantageously, failover mechanism 990 is portable and may be easily implemented in a wide variety of systems running a variety of operating systems. In one embodiment, upon completing a failover to secondary connection 984, monitoring of secondary connection 984 begins and a failover to primary connection 982 may be initiated in the event secondary connection 984 fails.

In an alternative embodiment, failover mechanism 990 may be configured to failover only when the performance level of a connection falls below a predetermined threshold. For example, while monitoring primary connection 982, failover mechanism 990 may detect a failure of connection 810A only. Trunking capability may then disable connection 810A and utilize the remaining three connections, 810B–810D, to continue communications. If the level of performance of primary connection 982 still exceeds a particular threshold, failover mechanism 990 may not perform a failover. If then failover mechanism 990 detects a failure of a second connection, 810B, and the performance of the primary connection 982 falls below the threshold, a failover to secondary connection 984 may be performed. Advantageously, failover may be performed only when deemed necessary. In one embodiment, failover mechanism 990 may be configured to read a configuration file to determine the failover threshold. For example, a threshold parameter may be set to 50% of connection capacity. Failover mechanism 990 may then perform a failover if 50% or more of the connections in a trunked interface fail.

Figure 10:
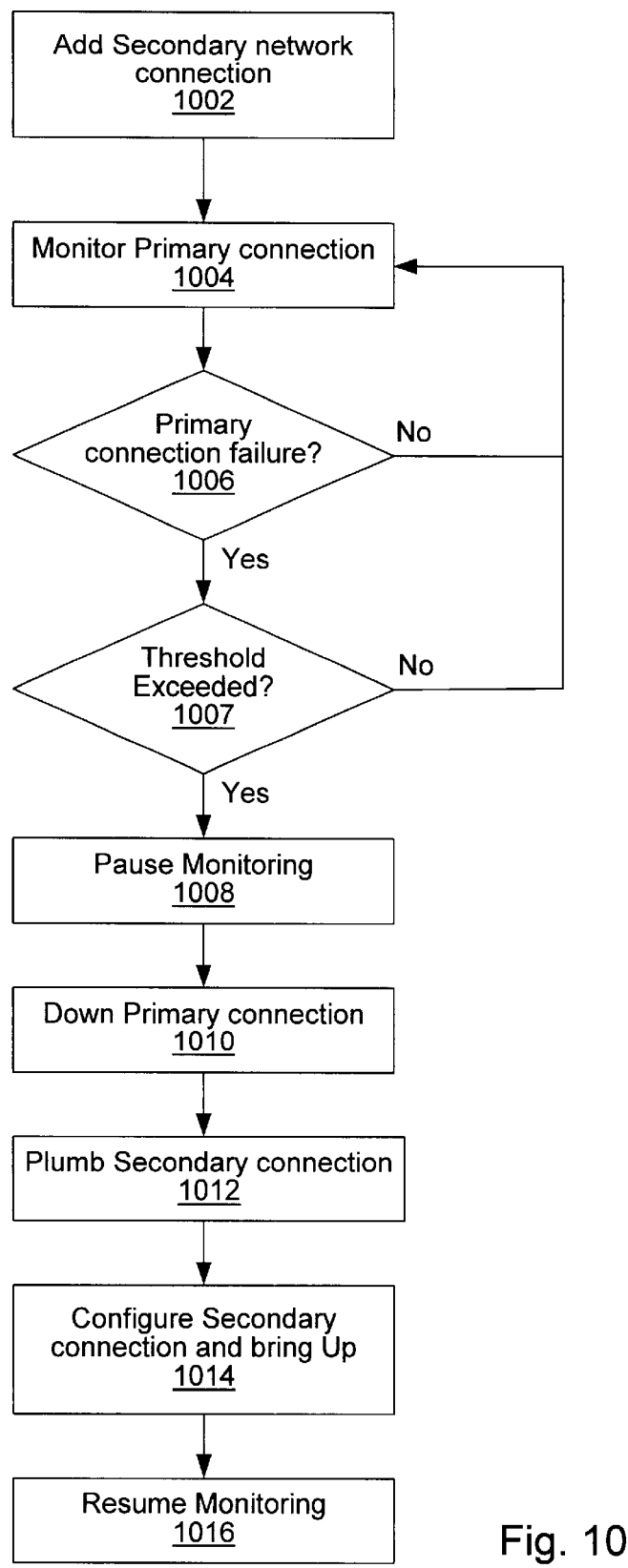
FIG. 10 is a diagram of a flowchart illustrating a failover method.

FIG. 10 is a flowchart illustrating a method for failover in a network utilizing trunking. Initially, a secondary network connection is added to a host (block 1002). This newly added connection includes an additional multi-ported NIC coupled to a trunking enabled switch. The primary network connection is then monitored for failure (block 1004). Such monitoring may include using a ping utility or polling a status register of the corresponding NIC. If no failure of the primary connection is detected (decision block 1006), monitoring of the primary connection continues (block 1004). If a failure of one or more of the trunking connections in the primary connection is detected (decision block 1006), a determination is made as to whether a performance related threshold parameter has been exceeded (decision block 1007). Such a determination may include reading a threshold parameter from a configuration file as described above. If the threshold parameter has not been exceeded, flow returns to block 1004. If the threshold parameter has been exceeded (decision block 1007), monitoring of the primary connection is paused (block 1008), the primary connection is brought down (block 1010) and the secondary connection is plumbed (block 1012). Finally, the secondary connection is configured with the parameters of the primary connection and brought up (block 1014), and monitoring of the newly enabled connection is started (block 1016).

In addition to the above described four port (quad) trunking technology, the described failover mechanism may be applied to other trunking technologies as well. For example, two Gigabit Ethernet ports may be combined to form a trunk. In the event one of the two Gigabit Ethernet connections fails, a failover may be performed to a redundant Gigabit Ethernet trunk. Further, the above description assumes a secondary connection is initially unplumbed. However, in the case of a host which utilizes a firewall technology, or other technology requiring all interfaces be defined at startup, a warm standby as described above may be utilized.

Alternate Pathing

Figure 11:
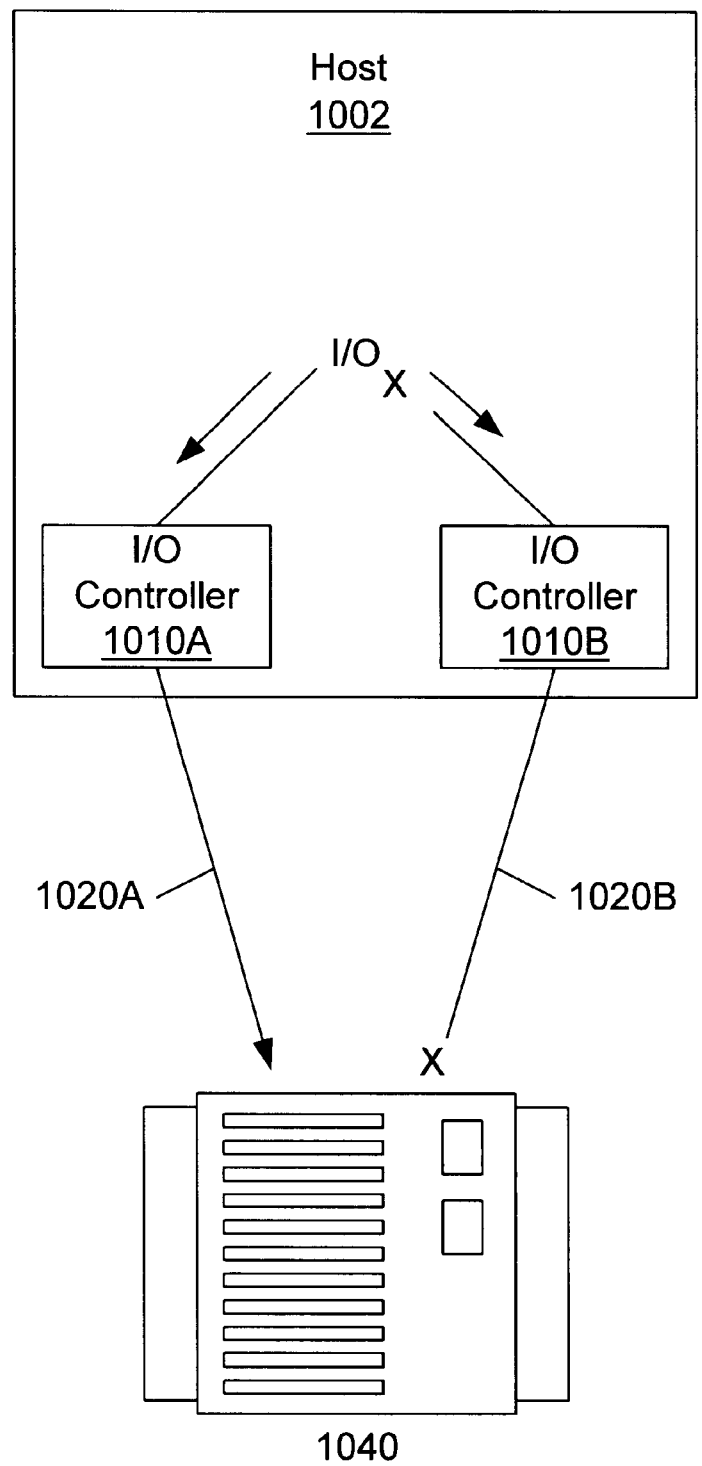
FIG. 11 is a diagram of a computer network with alternate pathing.

Alternate pathing is a technology which provides for redundancy to storage in case of a failed I/O controller. In addition to providing for recovery after failure, alternate pathing may also be used to support dynamic reconfiguration. Dynamic reconfiguration is used to logically attach and detach system boards from a running operating system, without the need to reboot. FIG. 11 is an illustration of a system utilizing alternate pathing technology. Included in FIG. 11 are host 1102, I/O controllers 1110A and 1110B, and disk array 1140. I/O controller 1110A is coupled to disk array 1140 via interconnect 1120A. I/O controller 1110B is coupled to disk array 1140 via interconnect 1120B. During ordinary operation, I/O controller 1110A is used for all I/O transactions between host 1102 and disk array 1140. In the event I/O controller 1110A fails, I/O controller 1110B is utilized for transactions between host 1102 and disk array 1140. On the other hand, the dynamic reconfiguration feature of alternate pathing provides that if the system administrator desires to remove or replace I/O controller 1110A without stopping and restarting host 1102, I/O controller 1110B may be enabled and I/O controller 1110A removed without the need to reboot host 1102.

Alternate pathing may also be used with network interfaces. When used with network interfaces, alternate pathing utilizes "metanetworking" to support alternate paths. A metanetwork is a logical construct that enables you to access a network by using one of two physical paths without having to explicitly reference either path. You reference a metanetwork using a metanetwork interface name such as "mether1" as will be discussed below. However, while alternate pathing may provide for dynamic reconfiguration of network interface cards, automatic failover for networks after boot is not supported. If alternate pathing is used with network interfaces and a failure occurs, a manual failover is required. Because of the necessary delay involved in a manual failover, network operations will be interrupted. By adding a failover mechanism to a system with alternate pathing, automatic failover and high availability may be attained.

Figure 12:
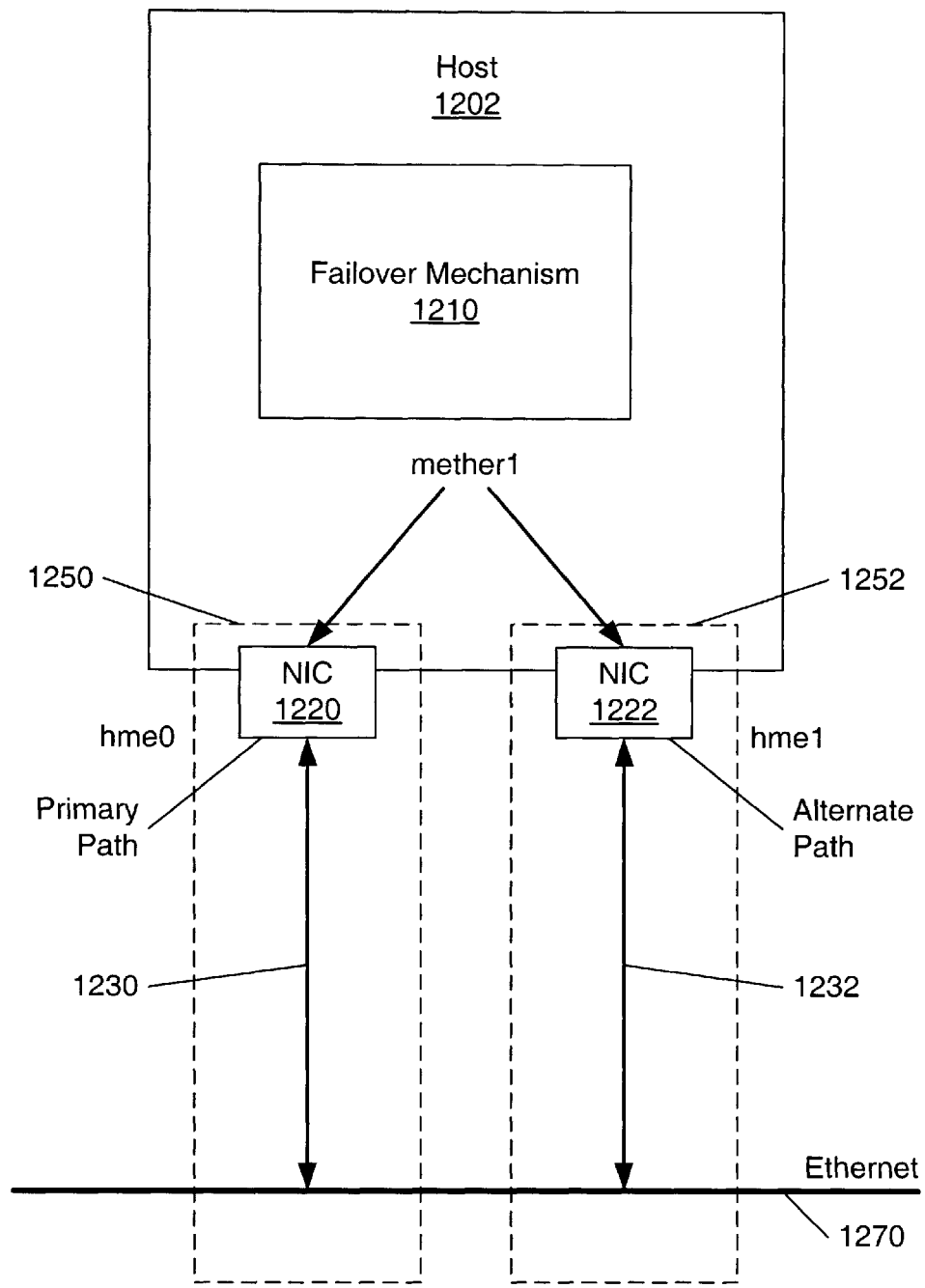
FIG. 12 is a diagram of a computer network with alternate pathing and a failover mechanism.

FIG. 12 is a diagram illustrating a system with alternate pathing and a failover mechanism. Shown in FIG. 12 is a host 1202 coupled to an Ethernet interconnect 1270. Host 1202 includes NIC 1220, NIC 1222 and failover mechanism 1210. NIC 1220 is coupled to Ethernet 1270 via connection 1230 and NIC 1222 is coupled to Ethernet 1270 via connection 1232. Connection 1250 represents a primary path and connection 1252 represents an alternate path. While NIC 1220 is named hme0 and NIC 1222 is named hme1, alternate pathing provides that host 1202 may refer to either path using the metaname "mether1". Primary path 1250 is active and alternate path 1252 is inactive. Consequently, all network communications to and from host 1202 occur on primary path 1250. Failover mechanism 1210 is configured to monitor primary path 1250 utilizing a heartbeat, polled status register, or other technique. When a failure of primary path 1250 is detected, failover mechanism 1210 may then perform an automatic failover to alternate path 1252. In one embodiment, failover mechanism 1210 may utilize the command "apconfig -P <metaname> -a <interface name>" to perform the failover, where "metaname" is the metaname associated with the logical network connection and "hme1" is the name corresponding to the physical interface. For example, in the system of FIG. 12, the command "apconfig -P mether0 -a hme1" may be used to activate alternate path 1252 and inactivate primary path 1250. Alternatively, the "ifconfig" command may be used to configure and bring up the alternate path as described above. Advantageously, high availability and serviceability may be attained in a network with alternate pathing.

Failover with Virtual IP Addresses

Many times an enterprise may wish to have multiple servers, but does not have the budget to invest in additional hardware. A typical example of such a case is an Internet Service Provider (ISP) who supplies multiple Web servers, but does not wish to provide a separate computer system for every server. One well known method of enabling multiple servers on a single machine is through the use of virtual IP addresses. A virtual IP address is a logical address created by a system administrator which typically corresponds to a real interface address. Because the virtual IP address is a logical address, multiple virtual IP addresses may be created which correspond to the same interface. Consequently, multiple Web servers with unique virtual IP addresses may be hosted on a single physical computer. In addition to providing the ability to have multiple servers on a single computer, virtual IP addresses may be used to provide for physical server redundancy and load balancing. For example, if a failure of an interface on a primary server occurs, a failover to a backup server may be utilized to maintain high availability.

Figure 13:
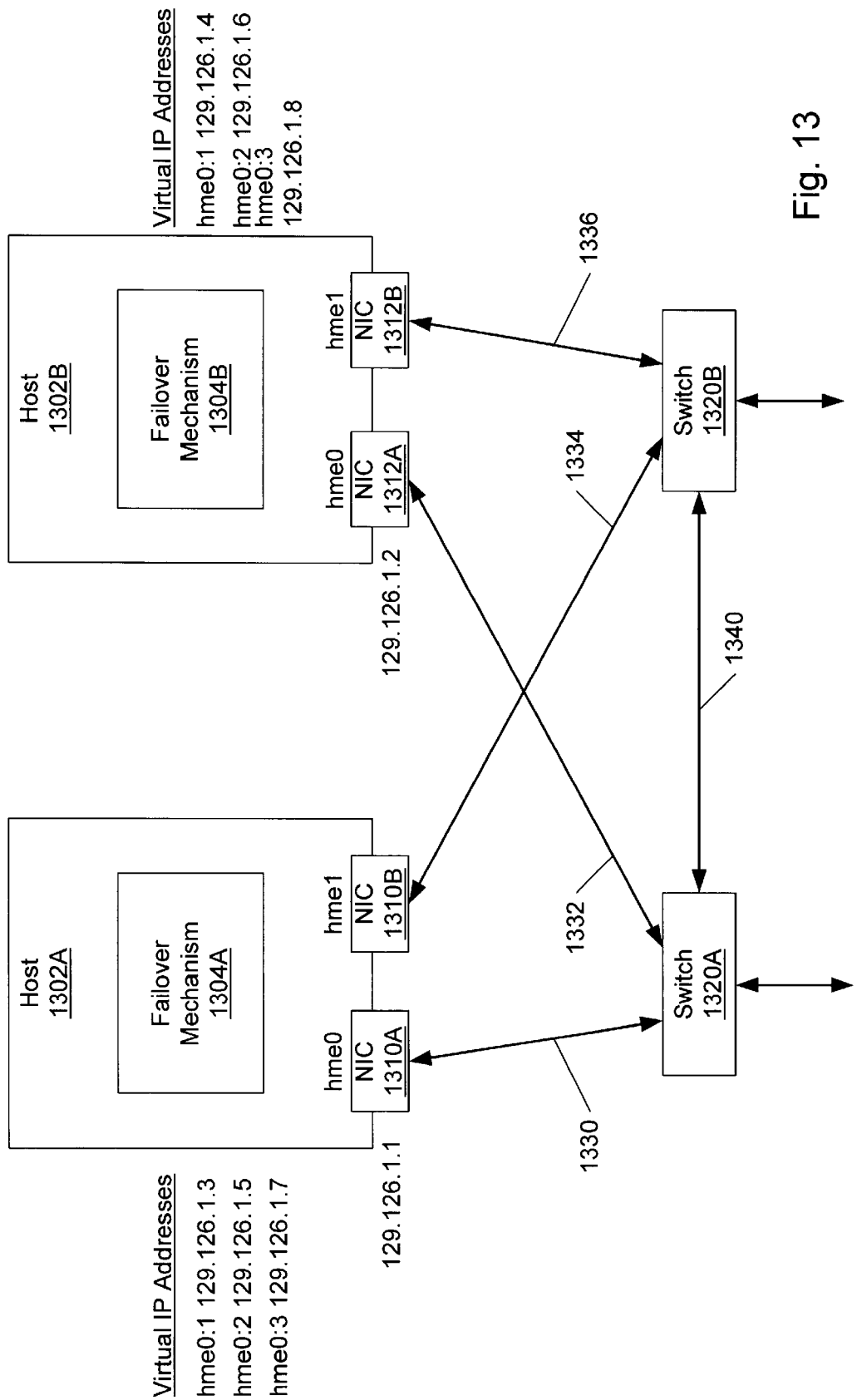
FIG. 13 is a diagram of a computer network utilizing virtual IP addresses and a failover mechanism.

FIG. 13 is an example of a computer system utilizing virtual IP addresses. Included in FIG. 13 are hosts 1302A and 1302B. Host 1302A includes failover mechanism 1304A, NIC 1310 A, and NIC 1310B. Host 1302B includes failover mechanism 1304B, NIC 1312A, and NIC 1312B. NIC 1310A is coupled to switch 1320A via interconnect 1330.

NIC 1310B is coupled to switch 1320B via interconnect 1334. NIC 1312A is coupled to switch 1320A via interconnect 1332. NIC 1312B is coupled to switch 1320B via interconnect 1336. Switch 1320 A is coupled to switch 1320B via interconnect 1340. NIC 1310A and NIC 1312A are named hme0. NIC 1310B and NIC 1312B are named hme1. NIC 1310A has an interface address of 129.126.1.1 and NIC 1312A has an interface address of 129.126.1.2. In one embodiment, NICs 1310B and 1312B serve as backup interfaces. Backup interfaces NIC 1310B and 1312B may be either cold or warm standby interfaces as described above. As cold interfaces, NIC 1310B and 1312B may have the same MAC address as primary interfaces NIC 1310A and 1312A, respectively. If backup interfaces 1310B and 1312B are warm, unique MAC addresses and dummy parameters may be utilized as previously discussed.

In order to create virtual IP addresses for interfaces 1310 and 1312, a command with the following syntax may be used:

ifconfig IF:N ip-address up where IF represents the actual interface name, N is a number typically between 1 and 255, and ip-address is the desired virtual IP address. Using the above syntax, the following command may be used to create virtual interfaces for host 1302A of FIG. 13:

ifconfig hme0:1 129.126.1.3 up
ifconfig hme0:2 129.126.1.5 up
ifconfig hme0:3 129.126.1.7 up Each of the three commands above defines and brings up a virtual address which corresponds to interface hme0 of host 1302A. When any of the above virtual addresses is specified, NIC 1310A recognizes the specified address as its own. Likewise the following commands may be used to create virtual addresses for NIC 1312A of host 1302B.

ifconfig hme0:1 129.126.1.4 up
ifconfig hme0:2 129.126.1.6 up
ifconfig hme0:3 129.126.1.8 up Each of the three commands above defines and brings up a virtual address which corresponds to interface hme0 of host 1302B. When any of the above virtual addresses is specified, NIC 1312A recognizes the specified address as its own.

Failover mechanism 1304A is configured to monitor NIC 1310A and 1310B. Monitoring may be done using a heartbeat mechanism, status register polling, or other similar mechanism. In the event failover mechanism 1304A detects a failure in communications through NIC 1310A, a failover to NIC 1310B may be performed. To perform failover from NIC 1310A to NIC 1312A, failover mechanism transfers the configuration parameters of NIC 1310A to NIC 1310B. Included in the parameters transferred from NIC 1310A to NIC 1310B is the interface address 129.126.1.1. However, because there are a number of virtual addresses associated with NIC 1310A, they must be transferred as well. Failover mechanism 1304 is configured to capture the current virtual IP address configuration of the interface 13310A at the time of failure and configure the backup interface 1310B with the captured parameters. To capture the virtual IP address configuration of an interface, failover mechanism 1304 may utilize a command such as ifconfig or ipconfig. Advantageously, all network IP addresses are failed over and high availability is maintained. In one embodiment, failover mechanism 1304 is configured to capture and store the virtual address configurations of the local interfaces upon startup. If upon failure of an interface connection, failover mechanism 1304 is unable to capture the current virtual address configuration, the originally captured startup configuration is used for configuring the backup interface.

Similarly, failover mechanism 1304B may be configured to perform a failover from NIC 1312A to NIC 1312B.

In addition to the embodiment described in FIG. 13, virtual IP addresses may be used in conjunction with a myriad of configurations, including the embodiments described above. When virtual addresses are employed, the included failover mechanism may be configured to failover the virtual addresses as well. Further, while the above description refers to commands "ipconFig" and "ifconFig", the particular command and syntax used on a particular system may vary. In addition, references to a network "node" or network "device" may include computers, routers, bridges, switches or other similar devices. Finally, the above described embodiments are only intended to be exemplary. Other embodiments, including variations and combinations of the above described features, are contemplated as well.

What is claimed is:

1. A method for maintaining high availability in a computer network, said method comprising:

adding a first High Availability Networking (HAnet) mechanism to a first node of said computer network, wherein said HAnet mechanism operates within an Application layer of an architectural model of said computer network;

adding a second network connection to said computer network, wherein said second network connection is between said first node and a second node of said network;

configuring an interface of said first node corresponding to said secondary connection with a first set of dummy configuration parameters upon startup;

disabling said secondary connection upon configuring said interface of said first node, wherein said disabled secondary connection is not active but said interface of said first node remains configured;

monitoring a first network connection of said computer network, wherein said first network connection is between said first node and said second node, and wherein said monitoring is by said first HAnet mechanism;

detecting a failure of said first network connection, wherein said failure is detected by said first HAnet mechanism; and performing a failover from said first network connection to said second network connection in response to detecting said failure, wherein said failover is performed by said first HAnet mechanism.

2. The method of claim 1, wherein said HAnet mechanism comprises computer software.

3. The method of claim 1, wherein said first network connection comprises a first network interface card in said first node coupled to a second network interface card in said second node, wherein said first network interface card and said second network interface card are coupled via a first crossover cable, and wherein said secondary connection comprises a third network interface card corresponding to said interface of said first node coupled to a fourth network interface card in said second node, wherein said third network interface card and said fourth network interface card are coupled via a second crossover cable.

4. The method of claim 3, wherein said failover comprises:

pausing monitoring of said first network interface card;

disabling said first network interface card;

configuring said third network interface card with interface address parameters corresponding to said first network interface card;

enabling said third network interface card; and resuming monitoring, wherein said third network interface card is monitored.

5. The method of claim 4, wherein said interface address parameters include an IP address, broadcast address, netmask address and MAC address.

6. The method of claim 5, wherein said interface address parameters further include a virtual IP address.

7. The method of claim 4, wherein said enabling is subsequent to the expiration of a time delay, wherein said time delay corresponds to a delay parameter read from a configuration file.

8. The method of claim 3, wherein said first network interface card, said second network interface card, said third network interface card, and said fourth network interface card are Ethernet adapters.

9. The method of claim 3, wherein said first network interface card, said second network interface card, said third network interface card, and said fourth network interface card are Gigabit Ethernet adapters.

10. The method of claim 1, wherein said first node and said second node comprise servers.

11. The method of claim 1, wherein said monitoring comprises said first node monitoring a heartbeat of said first network connection.

12. The method of claim 11, wherein said heartbeat comprises said first node conveying request packets to said second node and said second node conveying reply packets to said first node, wherein said request packets and said reply packets are conveyed via said first network connection.

13. The method of claim 12, wherein detecting said failure of said first network connection comprises detecting said reply packets are not received from said second node.

14. The method of claim 1, wherein said monitoring comprises polling a status register corresponding to said first network connection.

15. The method of claim 14, wherein said status register is in a network interface card.

16. The method of claim 14, wherein said detecting said failure of said first network connection comprises detecting said status register indicates said first connection has failed.

17. The method of claim 1, wherein performing said failover comprises disabling said first network connection and enabling said second network connection.

18. The method of claim 1, further comprising:

adding a second High Availability Networking (HAnet) mechanism to said second node of said computer network, wherein said second HAnet mechanism operates within an Application layer of an architectural model of said computer network;

configuring an interface of said second node corresponding to said second network connection with a second set of configuration parameters upon startup;

monitoring said first network connection of said computer network, wherein said monitoring is by said second HAnet mechanism;

detecting said failure of said first network connection, wherein said failure is detected by said second HAnet mechanism; and performing a failover from said first network connection to said second network connection in response to detecting said failure, wherein said failover is performed by said second HAnet mechanism.

19. A network node comprising:

a first network interface;

a second network interface;

a High Availability Networking (HAnet) mechanism, wherein said HAnet mechanism operates within an Application layer of an architectural model of said computer network, wherein said HAnet mechanism is configured to configure said second network interface with a first set of configuration parameters upon startup and disable said second connection upon configuring said second network interface, wherein said disabled second connection is not active but said second network interface remains configured, monitor said first network interface, and perform a failover from said first network interface to said second network interface in response to detecting a failure of a network connection corresponding to said first network interface.

20. The network node of claim 19, wherein said HAnet mechanism is configured to monitor said first network interface by monitoring a heartbeat of a network connection corresponding to said first network interface.

21. The network node of claim 20, wherein said heartbeat comprises conveying request packets and receiving reply packets via said first network interface.

22. The network node of claim 19, wherein said HAnet mechanism is configured to monitor said first network interface by polling a status register of said first network interface.

23. The network node of claim 19, wherein said failover comprises disabling said first network interface and enabling said second network interface.

24. The network node of claim 19, wherein said failover comprises:

pausing monitoring of said first network interface;

disabling said first network interface;

configuring said second network interface with interface address parameters corresponding to said first network interface;

enabling said second network interface; and resuming monitoring, wherein said second network interface is monitored.

25. The network node of claim 24, wherein said interface address parameters include an IP address, broadcast address, netmask address and MAC address.

26. The network node of claim 25, wherein said interface address parameters further include a virtual IP address.

27. The network node of claim 19, wherein said first network interface and said second network interface comprise Ethernet adapters.

28. The network node of claim 19, wherein said first network interface and said second network interface comprise Gigabit Ethernet adapters.

29. A computer network configured to maintain high availability, said computer network comprising:

a first node, wherein said first node includes a first High Availability Networking (HAnet) mechanism, wherein said first HAnet mechanism operates within an Application layer of an architectural model of said computer network;

a second node;

a second network connection, wherein said second network connection is between said first node and said second node;

a first network connection, wherein said first network connection is between said first node and said second node, and wherein said HAnet mechanism is configured to configure a network interface of said first node corresponding to said second network connection with a first set of configuration parameters upon startup, disable said second network connection upon configuring said network interface of said first node, wherein said disabled second connection is not active but said network interface of said first node remains configured, monitor said first network connection, and perform a failover from said first network connection to said second network connection in response to detecting a failure of said first network connection.

30. The computer network of claim 29, wherein said first HAnet mechanism is configured to monitor said first network connection by monitoring a heartbeat of said first network connection.

31. The computer network of claim 30, wherein said heartbeat comprises conveying request packets and receiving reply packets via said first network interface.

32. The computer network of claim 29, wherein said first HAnet mechanism is configured to monitor said first network connection by polling a status register corresponding to a network interface of said first node.

33. The computer network of claim 29, wherein said failover comprises disabling said first network connection and enabling said second network connection.

34. The computer network of claim 29, wherein said failover comprises:

pausing monitoring of said first network connection;

disabling said first network connection;

configuring a second network interface of said first node corresponding to said second network connection with interface address parameters corresponding to said network interface of said first node;

enabling said second network connection; and resuming monitoring, wherein said second network connection is monitored.

35. The computer network of claim 34, wherein said interface address parameters include an IP address, broadcast address, netmask address and MAC address.

36. The computer network of claim 35, wherein said interface address parameters further include a virtual IP address.

37. The computer network of claim 29, wherein said first network interface and said second network interface comprise Ethernet adapters.

38. The computer network of claim 29, wherein said first network interface and said second network interface comprise Gigabit Ethernet adapters.

39. The computer network of claim 29, wherein said second node includes a second High Availability Networking (HAnet) mechanism, wherein said second HAnet mechanism operates within an Application layer of an architectural model of said computer network, wherein said second HAnet mechanism is configured to monitor said first network connection, and wherein said HAnet mechanism is configured to detect said failure of said first network connection, and wherein said HAnet mechanism is configured to perform a failover from said first network connection to said second network connection in response to detecting said failure.

* * * * *